United States Patent
Al Rawi et al.

(10) Patent No.: US 12,320,890 B2
(45) Date of Patent: Jun. 3, 2025

(54) WIRELESS SENSING METHOD

(71) Applicant: BRITISH TELECOMMUNICATIONS PUBLIC LIMITED COMPANY, London (GB)

(72) Inventors: Anas Al Rawi, London (GB); Christopher Botham, London (GB); Francis Scahill, London (GB); Simon Ringland, London (GB)

(73) Assignee: British Telecommunications Public Limited Company, London (GB)

( * ) Notice: Subject to any disclaimer, the term of this patent is extended or adjusted under 35 U.S.C. 154(b) by 166 days.

(21) Appl. No.: 18/260,509

(22) PCT Filed: Dec. 17, 2021

(86) PCT No.: PCT/EP2021/086582
§ 371 (c)(1),
(2) Date: Jul. 6, 2023

(87) PCT Pub. No.: WO2022/148639
PCT Pub. Date: Jul. 14, 2022

(65) Prior Publication Data
US 2024/0061096 A1   Feb. 22, 2024

(30) Foreign Application Priority Data

Jan. 6, 2021   (GB) ..................... 2100129

(51) Int. Cl.
*G08B 1/08*   (2006.01)
*G01S 7/292*   (2006.01)
*G01S 13/72*   (2006.01)

(52) U.S. Cl.
CPC .............. *G01S 13/72* (2013.01); *G01S 7/292* (2013.01)

(58) Field of Classification Search
CPC .......... G01S 13/72; G01S 7/292; G01S 7/038; G01S 7/2922
(Continued)

(56) References Cited

U.S. PATENT DOCUMENTS 9,791,551 B1   10/2017   Eshraghi et al.
12,111,419 B1 *   10/2024   Blackmon ............. G01S 13/887
(Continued)

OTHER PUBLICATIONS

Combined Search and Examination Report under Sections 17 and 18(3) for Great Britain Application No. 2100129.2, mailed on Jul. 2, 2021, 7 pages.
(Continued)

*Primary Examiner* — Tai T Nguyen
(74) *Attorney, Agent, or Firm* — EIP US LLP

(57) ABSTRACT

There is herein provided a provided a method of wireless sensing that can include, at a transmitter which is a component of a transceiver device, transmitting a wireless signal such that the transmitted wireless signal is scattered by an object so as to produce a scattered signal, at a receiver which is a component of the transceiver device, receiving the scattered signal, performing processing on the wireless signal before it is transmitted and/or on the received scattered signal, the processing including an indication of self-coupling occurring at the transceiver device, following the processing, using the received signal to determine information relating to the object, the information including one or more of: a location of the object; a direction of movement of the object; or a speed of the object.

11 Claims, 2 Drawing Sheets

(58) Field of Classification Search
USPC .................................................... 340/539.1
See application file for complete search history.

(56) References Cited

U.S. PATENT DOCUMENTS

| | | |
|---|---|---|
| 2017/0139043 A1* | 5/2017 | Takada .................... G01S 7/412 |
| 2019/0353750 A1 | 11/2019 | Rimini et al. |
| 2020/0297236 A1 | 9/2020 | Rimini et al. |

OTHER PUBLICATIONS

International Search Report and Written Opinion for International Application No. PCT/EP2021/086582, mailed Jun. 10, 2022, 20 pages.

Invitation to Pay Additional Fees with Partial International Search for Application No. PCT/EP2021/086582 mailed Apr. 19, 2022, 11 pages.

* cited by examiner

WIRELESS SENSING METHOD

PRIORITY CLAIM

The present application is a National Phase entry of PCT Application No. PCT/EP2021/086582, filed Dec. 17, 2021, which claims priority from GB Patent Application No. 2100129.2, filed Jan. 6, 2021, each of which is hereby fully incorporated herein by reference.

TECHNICAL FIELD

The present disclosure is in the field of wireless sensing.

BACKGROUND

Current methods of wireless sensing involve the transmitting signals between two paired devices and analyzing how the RF characteristics of the received signals vary over time. These RF characteristics include the strength of the received signal, the angle of incidence of the signal at the receiver and the time of flight of the signal. This information can be used to improve the quality of the communication between the paired devices and to detect motion of objects in the vicinity of the devices.

SUMMARY

It is desirable to have alternative methods of wireless sensing.

According to a first aspect of the disclosure there is provided a method of wireless sensing, the method comprising: at a transmitter which is a component of a transceiver device, transmitting a wireless signal such that the transmitted wireless signal is scattered by an object so as to produce a scattered signal, at a receiver which is a component of the transceiver device, receiving the scattered signal, performing processing on the wireless signal before it is transmitted and/or on the received scattered signal, the processing comprising an indication of an extent to which self-coupling is occurring at the transceiver device, following the processing, using the received signal to determine information relating to the object, the information comprising one or more of: a location of the object; a direction of movement of the object; and a speed of the object.

Embodiments of the disclosure enable the self-interference component of the received signal to be reduced or removed altogether, enabling a more accurate measurement of the location, direction and speed of an object. It achieves this without the need for two paired devices.

According to a second aspect of the disclosure there is provided a wireless sensing transceiver device comprising: a transmitter for transmitting a wireless signal such that the transmitted wireless signal is scattered by an object, a receiver for receiving a signal comprising the scattered signal, a processor for performing processing on the transmitted signal prior to transmission and/or the received signal; the processing comprising an indication of an extent to which self-coupling is occurring at the transceiver device, the processor being suitable for using the processed signal to determine information relating to the object, the information comprising one or more of: a location of the object; a direction of movement of the object; and a speed of the object.

Using embodiments of this disclosure, a single wireless device can function as both a router for a WLAN and also as an intruder alarm without the need for multiple paired devices. For example, when the residents of a property leave the property for a period of time, they may set the router of their WLAN to operate in accordance with the disclosure. If the router determines that an unexpected object (e.g. an intruder) is moving in the property, it may contact the relevant authorities. Alternatively the device could be used in a care home for the elderly. The device may send an alert to staff if it detects that no movement has occurred for an extended period, as the resident may be in need of assistance.

The transmitter and/or receiver may operate continuously i.e. in a full duplex mode of operation. The wireless signal may be Wi-Fi, 5G, 6G or LTE. This list is non-exhaustive. The skilled person would understand the term "wireless signal" in this context to exclude radar signals. The transmitter and receiver may use the same aerial.

The device may be for use in an indoor setting, such as a residence or an office. The device may be a communication device and may be router for a WLAN. The WLAN may contain one or more other devices.

The object may be a person. There may be a line of sight between the object and the receiver. When passing from the object to the receiver, the scattered signal may pass through the air only.

The transceiver may comprise a Multiple Input Multiple Output (MIMO) antenna array. The indication of an extent to which self-coupling is occurring may comprise a measure of self-coupling at the transceiver device. The processing may comprise reducing or removing a self-coupling component from the received signal. The self-coupling component may be received by the receiver directly from the transmitter. Self-coupling may arise because incomplete antennae matching or a portion of the transmitted signal may be reflected from discontinuities in the atmosphere in the vicinity of the transmitter as well as the mutual electromagnetic coupling between as a result of nearfield at the transmitter and receiver arrays. This increases the amount of noise in the received signal. The method may further comprise making one or more measurements of the self-coupling at the antenna array of the transmitter and receiver. In some embodiments the processing comprises Null-Space Projection (NSP). The processing step may comprise multiplying the wireless signal and/or the received scattered signal by a digital spatial filter incorporating the measure of self-coupling at the transceiver device. The digital spatial filter may comprise eigenvectors of a self-coupling channel function. The eigenvectors may be obtained by single-value decomposition of a self-coupling channel function. The self-coupling channel function may comprise channel state information relating to the self-coupling channel.

The processing may comprise postcoding the received signal. This may comprise multiplying the received signal by a postcoding digital spatial filter. The processing may comprise precoding the transmitted signal. This may comprise multiplying the signal to be transmitted by a precoding digital spatial filter. The postcoding digital spatial filter may be related to the precoding digital spatial filter. In some embodiments the combined effect of the precoding and postcoding steps is to reduce self-coupling, such as to zero.

The method may further comprise transmitting the wireless signal from a second transmitter such that the transmitted wireless signal is scattered by an object so as to produce a scattered signal, and/or receiving the scattered signal at a second receiver. The second transmitter and the second receiver may be components of the transceiver device and may be located on a second aerial of the transceiver device. The processing may be performed on the wireless signal before it is transmitted by the second transmitter and/or on the received scattered signal after it is received by the second receiver. The above-mentioned operations applicable to the transmitter and receiver are likewise applicable to the second transmitter and second receiver.

The measure of the self-coupling at the transceiver device may comprise a measure of self-coupling from the second transmitter to the second receiver, and/or from the first transmitter to the second receiver, and/or from the second transmitter to the first receiver.

Using the received signal to determine information relating to the object may comprise measuring how the received signal varies over a time interval. This may comprise measuring the time impulse response of the received signal.

Using the received signal to determine information relating to the object may only use the portion of the received signal which is received within a predetermined time interval. The predetermined time interval may be calculated to as to include only signals that have been scattered by objects within a particular radius (e.g. the length of a room or office).

The method may be performed repeatedly and the time impulse response from successive iterations may be compared in order to determine the direction and speed of the object.

The method may apply time gating to the self-coupling echo measurement to set out the range of detection and echo cancellation.

BRIEF DESCRIPTION OF THE DRAWINGS

Specific embodiments of the disclosure will now be described in detail, for illustration only, with reference to the appended drawings, in which.

DETAILED DESCRIPTION

Figure 1:
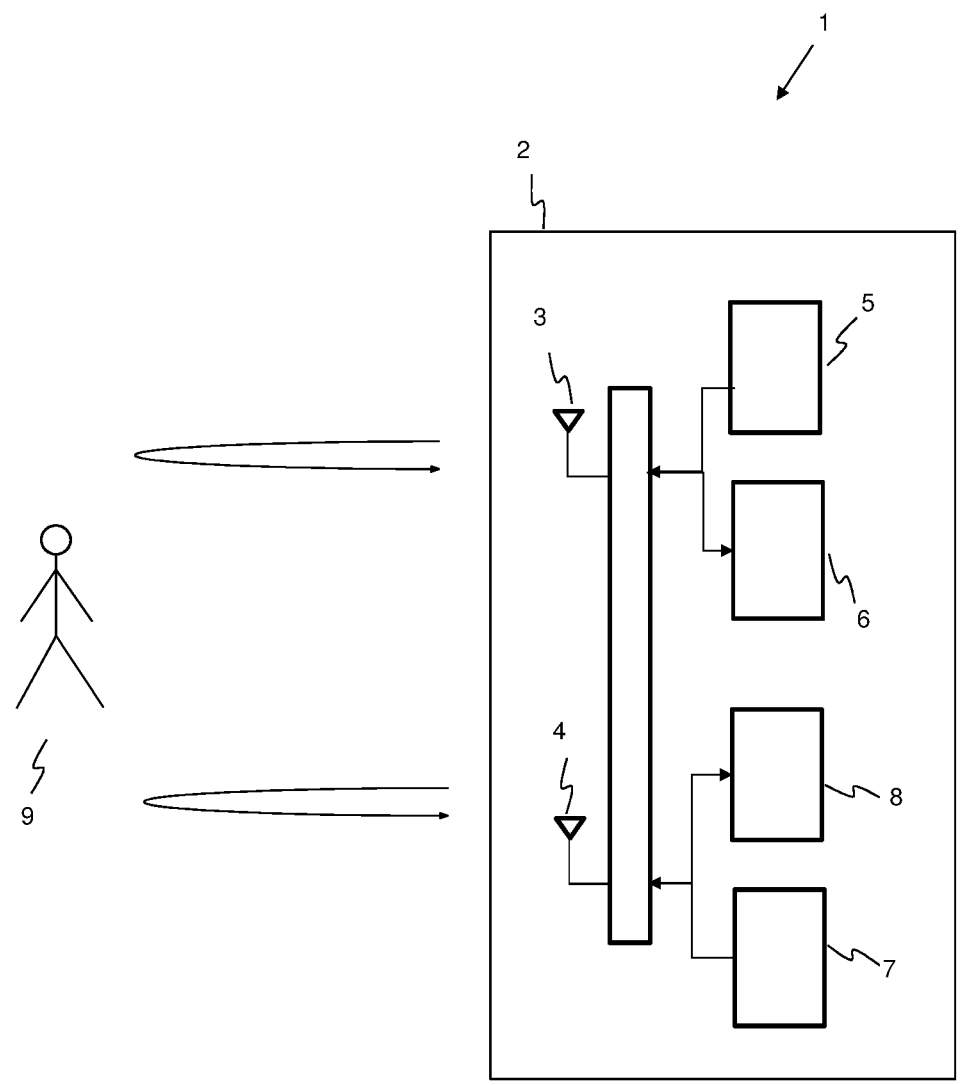
FIG. 1 is a schematic representation of a the method according to the disclosure.

A MIMO system according to the disclosure is shown generally at 1 in FIG. 1. The MIMO system 1 comprises a router 2 located in a room in a house. The router 2 contains a first aerial 3 and a second aerial 4. The first aerial 3 has a Wi-Fi transmitter 5 and a Wi-Fi receiver 6. The second aerial 4 has a Wi-Fi transmitter 7 and a Wi-Fi receiver 8.

Embodiments of the present disclosure address, inter alia, a problematic phenomenon known as self-interference. When a transmitter transmits a signal, a portion of the transmitted signal is received by neighboring receiver(s). This occurs because, for example, the transmitted signal reflects from permanent or temporary discontinuities in the atmosphere in the vicinity of the transmitter aerial. The greater the impedance mismatch between the aerial and the atmosphere, the greater the self-interference. Embodiments of the disclosure address this problem by multiplying the signal to be transmitted by a first spatial filter. The resulting signal is then transmitted by both transmitter 5 and transmitter 7. The transmitted signal is scattered from an object 9 (which in this case is a person) in the room. The scattered signal is then received by receivers 6 and 8. The received signal is then multiplied by a second spatial filter. The second spatial filter is related to the first spatial filter. In addition to the scattered signal, receivers 6 and 8 receive the above-described self-interference signals, i.e. reflections of the transmitted signal from discontinuities in the atmosphere. The combined effect of the first and second spatial filters is to remove this self-coupling component from the received signal, leaving only the portion of the received signal which was scattered from the object 9.

The resulting signal is then analyzed. In particular, the time impulse response of the signal is analyzed. The distance between the receivers 6 and 8 and the object can be estimated from the time at which a peak is seen in the time impulse response. In other words, the time lag between transmission of the signal from transmitters 5 and 7 and reception of the signal at receivers 6 and 8. The sooner a peak is seen, i.e. the smaller the time lag, the closer the object is to the receiver. Furthermore, the time impulse response is measured continuously. A variation in the time impulse response over time indicates that the object is moving. If the variation is such that the time lag between transmission and reception is decreasing, it can be deduced that the object is moving closer to the receivers 6 and 8. If the time lag between transmission and reception is increasing, it can be deduced that the object is moving away from the receivers 6 and 8.

Figure 2:
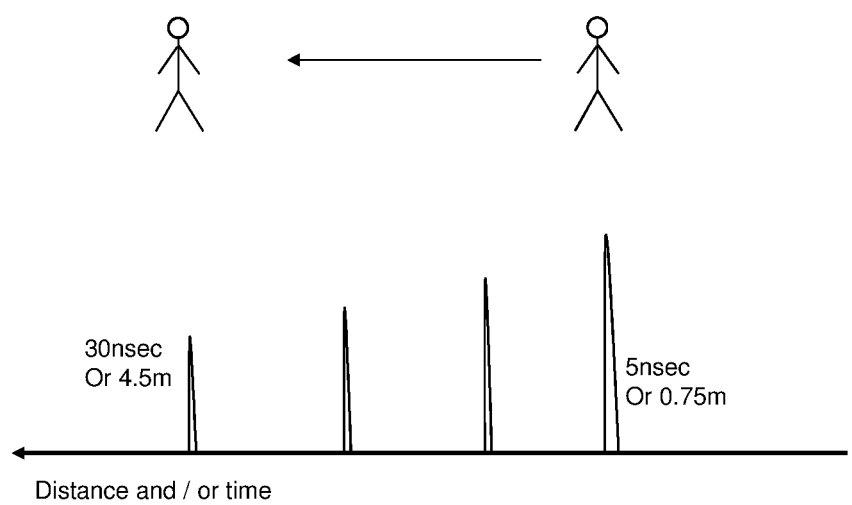
FIG. 2 is a schematic representation of a time impulse response obtained according to an embodiment of the disclosure.

FIG. 2 shows a schematic plot of the response of a transceiver performing the method of an embodiment of the disclosure against the distance between the transceiver and the object (in this case a person). Distance (time-of flight) runs right to left on the horizontal axis. The receiver response is on the vertical axis. The person is running away from the transceiver (not shown). The person is shown at two locations: 0.75 m from the transceiver and at 4.5 m from the transceiver. It can be seen that the response decreases with increasing separation.

Time gating is used in receiving the signal at receivers 6 and 8. In particular, the receivers only accept an input signal within a predetermined time window. This ensures that the received signal originates from the scattered transmitted signal and not from e.g. an echo of a previously transmitted signal.

The signal processing involving the first and second spatial filters will now be described mathematically.

Consider a router having two antennae (1 and 2) each with a transmitter and receiver. In use, self-coupling (i.e. self-coupling echo) will occur. In particular, the signals transmitted from the transmitter on antenna 1 with be received by the receiver on antenna 1 and also by the receiver on antenna 2. Similarly, the signals transmitted from the transmitter on antenna 2 with be received by the receiver on antenna 1 and also by the receiver on antenna 2. This self-coupling can be represented by the self-coupling matrix:

$$H_{aa} = \begin{bmatrix} h_{11} & h_{12} \\ h_{21} & h_{22} \end{bmatrix}$$

where $h_{ij}$ is the self-coupling of antenna j with antenna i; in particular:

$h_{11}$ is the coupling from transmitter on antenna 1 to the receiver on antenna 1;

$h_{22}$ is the coupling from transmitter on antenna 2 to the receiver on antenna 2;

$h_{21}$ is the coupling from transmitter on antenna 1 to the receiver on antenna 2;

$h_{12}$ is the coupling from transmitter on antenna 2 to the receiver on antenna 1.

Embodiments of the present uses null space projection to remove this self-coupling from the signal received the receiver on antenna 1. This is achieved by precoding the signal to be transmitted from transmitter on antenna 1 using the spatial filter $F_a$ and postcoding the received signal using the spatial filter $G_a$.

The two spatial filters $F_a$ and $G_a$ are designed such that:

$$G_a H_{aa} F_a x \sim 0$$

Thus, the combined effect of the spatial filters is to reduce the self-coupling component of the received signal to zero. The filters are designed as follows:

Firstly, $H_{aa}$ is decomposed into its eigenvectors and values via singular value decomposition. In particular:

$SVD(H_{aa})=U_{aa}\Sigma_{aa}V_{aa}$, where $U_{aa}$ and $V_{aa}$ are unitary matrices containing the eigenvectors and $\Sigma_{aa}$ is a diagonal matrix containing the eigenvalues.

$F_a$ is obtained using the eigenvector unitary matrix $V_{aa}$ as follows:

$$F_a = V_{aa} * T_a = \begin{bmatrix} v_{11} & v_{12} \\ v_{21} & v_{22} \end{bmatrix} \begin{bmatrix} 0 \\ 1 \end{bmatrix}$$

$G_a$ is obtained using the eigenvector unitary matrix $U_{aa}$ as follows:

$$G_a = W_a * U_{aa}^H = \begin{bmatrix} 1 & 0 \end{bmatrix} \begin{bmatrix} u_{11}^* & u_{21}^* \\ u_{12}^* & u_{22}^* \end{bmatrix}$$

where H is the Hermitian (equivalent to transpose conjugate) and * is the conjugate operator.

The above values for spatial filters $F_a$ and $G_a$ meet the above-mentioned condition:

$$G_a H_{aa} F_a X \sim 0$$

The total received signal at the receiver of antenna 1 is:

$$y = G_a(H_{aa}F_a x_a + H_{ab}F_b x_b + n_r) = \overline{G_a H_{aa} F_a}^{\cong 0} x_a + G_a H_{ab} F_b x_b + G_a n_r$$

As can be seen from the equation immediately above, the self-coupling term (i.e. the component containing $H_{aa}$) has been reduced to zero. This means that the self-coupling component of the received signal has been removed by the combined effect of the spatial filters $F_a$ and $G_a$.

The invention claimed is:

1. A method of wireless sensing, the method comprising:
   at a transmitter which is a component of a transceiver device, transmitting a wireless signal such that the transmitted wireless signal is scattered by an object so as to produce a scattered signal,
   at a receiver which is a component of the transceiver device, receiving the scattered signal,
   performing processing:
      on the wireless signal before the wireless signal is transmitted, or
      on the received scattered signal, or
      both on the wireless signal before the wireless signal is transmitted and on the received scatter signal,
   wherein the processing comprises an indication of an extent to which self-coupling is occurring at the transceiver device;
   following the processing, using the received scattered signal to determine information relating to the object, the information comprising one or more of:
      a location of the object,
      a direction of movement of the object, or
      a speed of the object.

2. The method as claimed in claim 1, further comprising making one or more measurements of the self-coupling at the transceiver device from the transmitter to the receiver.

3. The method as claimed in claim 1, wherein the processing comprises Null-Space Projection (NSP).

4. The method as claimed in claim 1, further comprising:
   transmitting the wireless signal from a second transmitter such that the transmitted wireless signal is scattered by an object so as to produce a scattered signal; and
   receiving the scattered signal at a second receiver,
   wherein the second transmitter and the second receiver are components of the transceiver device and are located on a second aerial of the transceiver device.

5. The method as claimed in claim 1, further comprising multiplying the received scattered signal by a precoding digital spatial filter.

6. The method as claimed in claim 1, the method further comprising multiplying the received scattered signal by a postcoding digital spatial filter.

7. The method as claimed in claim 5, wherein the precoding digital spatial filter comprises eigenvectors of a self-coupling channel function.

8. The method as claimed in claim 7, wherein the eigenvectors are obtained by single-value decomposition of a self-coupling channel function.

9. A wireless sensing transceiver device comprising:
   a transmitter for transmitting a wireless signal such that the transmitted wireless signal is scattered by an object;
   a receiver for receiving a signal comprising the scattered signal;
   a processor for performing processing on:
      the transmitted wireless signal prior to transmission, or
      the received signal, or
      both the transmitted wireless signal prior to transmission and the received signal,
   wherein the processing comprises an indication of an extent to which self-coupling is occurring at the wireless sensing transceiver device, and wherein the processor is configured to use the processed signal to determine information relating to the object, the information comprising one or more of:
      a location of the object,
      a direction of movement of the object, or
      a speed of the object.

10. The method as claimed in claim 6, wherein the postcoding digital spatial filter comprises eigenvectors of a self-coupling channel function.

11. The method as claimed in claim 10, wherein the eigenvectors are obtained by single-value decomposition of a self-coupling channel function.

* * * * *